United States Patent [19]

Hegar

[11] 3,729,459

[45] Apr. 24, 1973

[54] BASIC MONOAZO DYESTUFFS

[75] Inventor: Gert Hegar, Schoenenbuch, Switzerland

[73] Assignee: Ciba-Geigy AG, Basle, Switzerland

[22] Filed: Dec. 5, 1969

[21] Appl. No.: 882,751

Related U.S. Application Data

[63] Continuation-in-part of Ser. No. 659,583, Aug. 10, 1967, abandoned.

[30] Foreign Application Priority Data

Aug. 17, 1966 Switzerland ........................ 11861/66
June 26, 1967 Switzerland .......................... 9053/67

[52] U.S. Cl. .................. 260/205, 260/152, 260/155, 260/156, 260/157, 260/158, 260/162, 260/184, 260/186, 260/187, 260/206, 260/207, 260/207.1, 260/208, 260/247.5 R, 260/286 Q, 260/459, 260/465 E, 260/471 A, 260/490, 260/501.15, 260/559 D, 260/562 P, 260/567.6 M

[51] Int. Cl. .....C09b 29/08, C09b 31/04, D06p 3/70

[58] Field of Search ...................... 260/205, 206, 152, 260/156, 184, 186, 187

[56] References Cited

UNITED STATES PATENTS

| | | | |
|---|---|---|---|
| 3,079,377 | 2/1963 | Sartori | 260/205 |
| 3,252,964 | 5/1966 | Fuchs et al. | 260/152 |

*Primary Examiner*—Floyd D. Higel
*Attorney*—Harry Goldsmith, Joseph G. Kolodny and Mario A. Monaco

[57] ABSTRACT

Basic monoazo dyestuff of the formula where R is alkyl, $R_1$ is phenyl or substituted phenyl, $R_2$ and $R_3$ are various organic substituents and X is an anion, which dyestuffs are useful in dyeing polyvinyl chloride, polyamide, polyurethane, polyester and especially polyacrylonitrile fibers with intense, level dyeings having good fastness to light and other good general fastness properties, having good stability within a wide pH range, having good affinity in aqueous solutions at different pH values and usually reserving wool wall.

5 Claims, No Drawings

BASIC MONOAZO DYESTUFFS

CROSS-REFERENCES TO RELATED APPLICATION

This is a continuation in part of application, Ser. No. 659,583, filed Aug. 10, 1967, and now abandoned.

DESCRIPTION OF THE PREFERRED EMBODIMENTS

The present invention is based on the observation that valuable basic monoazo dyestuffs, which are free from acidic groups imparting solubility in water, particularly sulphonic acid and carboxylic acid groups, and correspond to the formula (1) 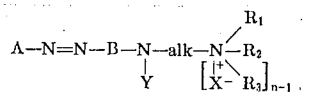

in which A represents the residue of a heterocyclic or aromatic amine, preferably of the benzene series, which is free from acidic groups imparting solubility in water and from azo groups, B represents a benzene residue bound to the azo group in paraposition to the amino group, Y represents an unsubstituted or substituted alkyl group, especially an ethyl or cyanoalkyl, alkoxyalkyl, acyloxyalkyl or cyanoalkoxyalkyl group or an alkylene chain containing a terminal ester or amide residue linked through its CO-group, alk represents a lower alkylene group which may be branched, preferably a propylene group which may be acylated or especially an ethylene group, $R_1$ represents a benzene residue, and $R_2$ and $R_3$ each stands for an alkyl or aralkyl group, and $R_2$ and $R_3$ together with the nitrogen atom may form a heterocycle, X stands for an anion and $n = 1$ or 2, and in which Y may also represent an alkylene bridge, which may be interrupted by a hetero atom, linked to the ortho-position of the coupling-directing amino group of nucleus B, may be obtained when (a) a diazo compound prepared from an amine of the aromatic or heterocyclic series, especially from an amine of the benzene series, is coupled with a coupling component of the formula (2) 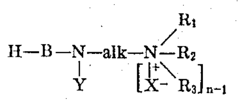

in which B, Y, X, alk, $R_1$, $R_2$, $R_3$ and n have the above meanings; or (b) an azo dyestuff of the formula (3) 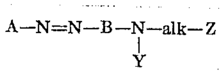

in which Z represents an eliminable atom or group, especially a halogen atom or an ester grouping, and alk, Y, A and B have the above meanings, is reacted with a secondary or tertiary amine of the formula (4a)  or (4b) 

where $R_1$, $R_2$ and $R_3$ have the above meaning; or, when $n = 2$, (c) an azo dyestuff of the formula (5) 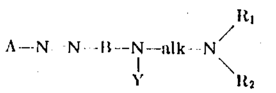

in which $R_1$, $R_2$, alk, Y, A and B have the above meanings, is treated with an alkylating agent of the formula $R_3X$ where $R_3$ and X have the meaning defined above.

The amino group in the coupling components to be used in process (a) of the present invention is substituted on the one hand by a substituted or unsubstituted alkyl group, e.g. by a β-cyanoethyl, β-methoxyethyl, β-cyanoethoxyethyl, β-acetoxy-ethyl or β-phenoxyethyl group, by a substituted or unsubstituted mercaptoethyl group or by a group $-CH_2-CO-CH_3$, $-CH_2-CO-C_6H_5$, $-CH_2CH_2-CO-NH_2$
$-CH_2CH_2-CO-OC_2H_5$, $-CH_2CH_2-CO-OC_6H_5$

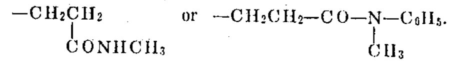

On the other hand, it must carry an aminoalkylene residue whose amino nitrogen atom carries a benzene residue and one or two alkyl groups, or a benzene residue and at the same time a hetero atom of a heterocyclic 5- or 6-membered ring system, for example of a morpholine or piperidine ring. The two benzene rings of these compounds preferably contain no further substituents or, if they do, only electron donors, that is to say substituents of positivating character, for example, alkyl, alkoxy, acylamino, amino, dialkylamino or acyloxy substituents.

As coupling components of this type the following may be mentioned:

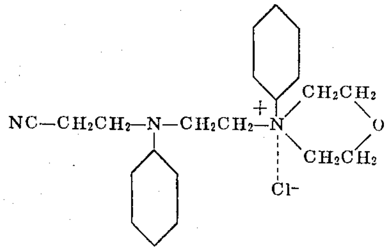

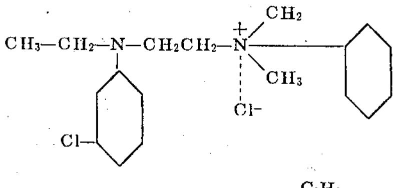

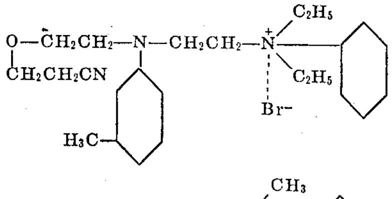

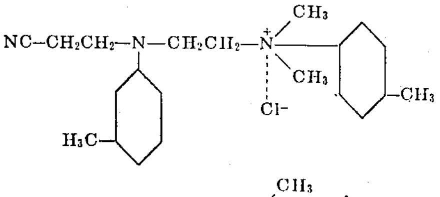

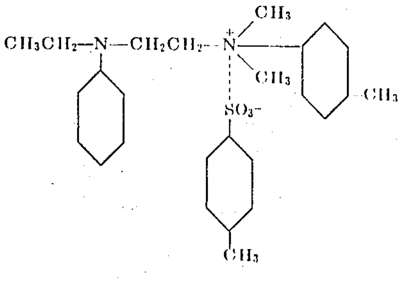

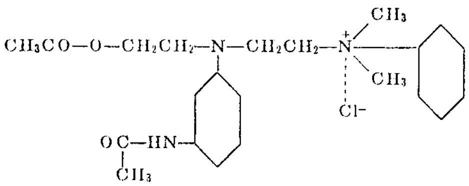

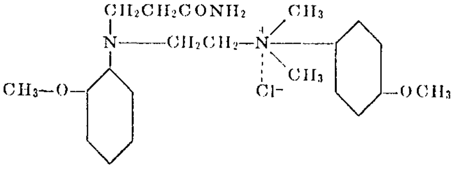

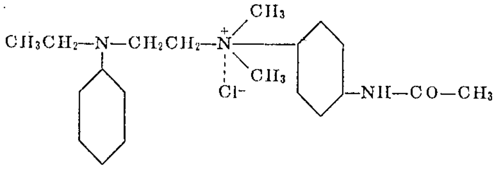

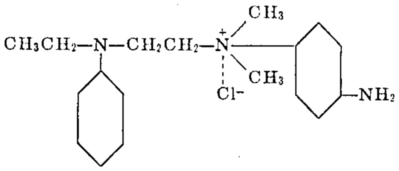

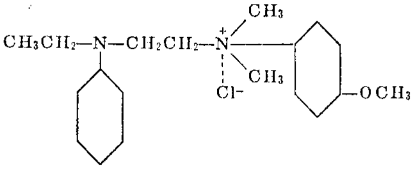

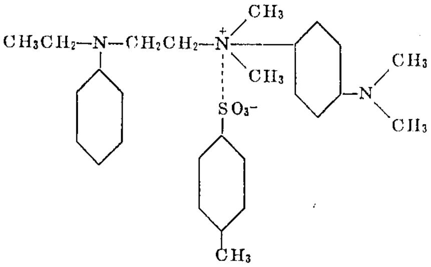

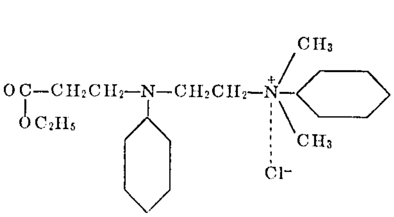

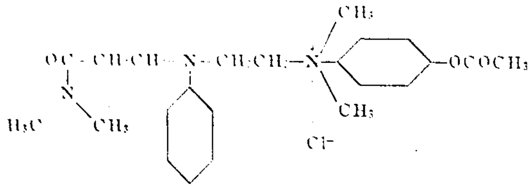

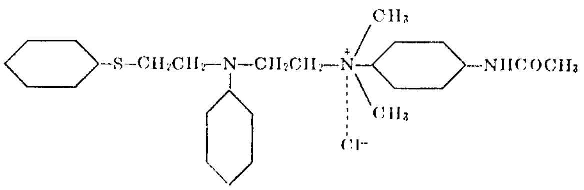

Furthermore the unquaternated compounds and the corresponding compounds that contain a hydroxy- or acyloxypropylene bridge between the two nitrogen atoms may also be mentioned and the compound of the formula

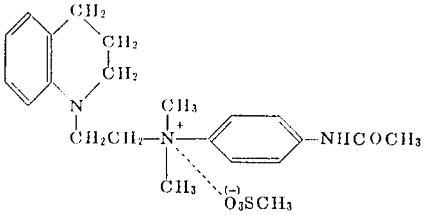

These compounds are obtained by condensing the corresponding N-(halogenalkyl)-aniline with a secondary or tertiary heterocyclic cyclic base in which the nitrogen atom carries a benzene residue, for example with N-phenylmorpholine, or with a tertiary aminobenzene, for example with dimethylaniline or diethylaniline, N,N-dimethyl-4-methoxy- or -4-acetylaminoaniline. Notwithstanding the slight difference in the basicity of the two reacting amines the condensation proceeds smoothly and gives an excellent yield of the desired product, practically without condensation of the halogenalkylaniline or sulphatoalkyl aniline with itself. These coupling components are new and the process for their manufacture is also included in the present invention.

Diazo components which are suitable are any desired diazotizable amines of the aromatic series, especially of the benzene series, or of the heterocyclic series, that do not contain acidic groups imparting solubility in water or azo groups and especially the amines containing a single benzene residue with at least one electro-negative substituent, for example a nitro group, a halogen atom and/or a nitrile group.

From the variety of suitable diazo components of the benzene series the following examples may be mentioned: aniline, 1-amino-3- or -4-chlorobenzene, 1-amino-4-bromobenzene, 1-amino-2-, -3- or -4-methylbenzene, 1-amino-2-, -3- or -4- nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carbethoxybenzene, 1-amino-2,4- or -2,5-dichlorobenzene, 1-amino-2,4-dibromobenzene, 1-amino-2-methyl-4- or -6-chlorobenzene, 1-amino-2-trifluoro-methyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-methanesulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carbethoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5- or -2,6-dichlorobenzene-4-sulphonyl-dimethylamide, 1-amino-2-chlorobenzene-4-sulphonyl-dimethylamide, 1-amino-2,6-dibromobenzene-4-sulphonamide, 1-amino-2,4-dinitro-6-chloro- or -6- bromobenzene, 1-amino-2,4-dicyano-6-chlorobenzene, 1-amino-2,4,6-trichloro- or -tribromobenzene, 1-aminobenzene-3- or -4-sulphonamide, 1-aminobenzene-3- or -4-sulphonic acid-N-methyl- or -N,N-diethylamide, 1-amino-4-nitrobenzene-2-methylsulphone, 1-aminobenzene-4-carboxylic acid-$\beta$-methoxyethyl ester, 4-aminodiphenyl and 2- or 4-amino-diphenyl ether.

Further suitable diazo components are any desired diazotizable heterocyclic amines that are free from acidic substituents imparting solubility in water, especially amines containing a 5- membered heterocycle with 2 or 3 hetero atoms, above all one nitrogen atom and one or two sulphur, oxygen or further nitrogen atoms as hetero atoms.

From the series of heterocyclic diazo components the following may be mentioned as examples: 2-aminothiazole, 2-amino-5-nitrothiazole, 2-amino-5-methylsulphonylthiazole, 2-amino-5-cyanothiazole, 2-amino-4-methyl -5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 3-amino-1-(4'-methoxyphenyl) -pyrazole, 2-aminobenzthiazole, 2-amino-6-methylbenzthiazole, 2-amino-6-methoxybenzthiazole, nitrobenzthiazole, 2-amino-6-carbethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl-1,3,4-thiadiazole, 2-amino-3-nitro-5-methylsulphonylthiophene and 2-amino-3,5-bis-(methylsulphonyl)-thiophene.

A mixture of two or more of the diazo components and a mixture of two or more of the coupling components may also be used in accordance with this invention.

The diazo components mentioned above may be diazotized by known methods, for example with a mineral acid, especially hydrochloric acid, and sodium nitrite or, for example, with a solution of nitrosylsulphuric acid in concentrated sulphuric acid.

The coupling reaction may likewise be carried out in known manner, for example in a neutral to acid medium, if desired or required in the presence of sodium acetate or of a similar buffer substance capable of influencing the rate of coupling, or of a catalyst, for example pyridine or a pyridine salt.

The new dyestuffs may also be prepared according to process (b) of the invention, by amidation of a dyestuff of the formula (3), in which Z represents a reactive group or a reactive atom, for example, a sulphato ester group or a halogen atom, by reaction with a secondary or tertiary amine. The starting azo dyestuffs used in this process (b) of the present invention may be obtained by coupling from the corresponding components as defined above. The reaction with the secondary or tertiary amines is advantageously carried out by heating in an excess of the amine in the presence or absence of a solvent. Suitable secondary or tertiary amines are, for example: N-methylaniline, N-methyl-para-toluidine, N-methyl-4-aminoacet-anilide, N-ethylaniline, N-ethyl-4-methoxyaniline, N-methyl-4-methoxyaniline, N-methyl-4-ethoxyaniline, N,N-dimethylaniline, N,N-diethylaniline, N,N-dimethyl-para-toluidine, N,N-dimethyl-4-methoxyaniline, N,N-dimethyl-4-acetoxyaniline, N,N-dimethyl-4-isopropylaniline, N,N-dimethyl-4-aminoacetanilide, N,N,N',N'-tetramethyl-1,4-phenylenediamine, N-phenylpiperidine, N-phenylmorpholine, N-(4'-methoxyphenyl)-piperidine, N-(4'-methylphenyl)-morpholine or N-(4'-methoxyphenyl)-morpholine.

When in this process the reaction is carried out starting from a secondary amine, the corresponding tertiary amino compounds are obtained, while reaction with a tertiary amine gives rise to the corresponding quaternary amino compounds.

Those new dyestuffs which contain a quaternated amino group ($n = 2$) can also be prepared according to the third process (c) of the present invention by quaternating the corresponding dyestuffs containing a tertiary amino group by treatment with an alkylating agent. Suitable alkylating or quaternating agents that may be used are, for example, esters of strong mineral acids or organic sulphonic acids, for example dimethylsulphate, diethylsulphate, alkyl halides, for example methyl chloride, bromide or iodide, or aralkyl halides, for example benzyl chloride, esters of lower alkanesulphonic acids, for example methyl esters of methane sulphonic, ethane sulphonic or butane sulphonic acids, and esters of benzene sulphonic acids which may contain additional substituents, for example methyl, ethyl, propyl or butyl esters of benzene sulphonic acid, of 2- or 4-methylbenzene sulphonic acid, 4-chlorobenzene sulphonic acid or 3- or 4-nitrobenzene sulphonic acid.

The alkylation is advantageously carried out by heating in an inert organic solvent, for example in a hydrocarbon for example benzene, toluene or xylene, a halohydrocarbon for example carbon tetrachloride, tetrachloroethane, chlorobenzene, ortho-dichlorobenzene, or in a nitrohydrocarbon for example nitromethane, nitrobenzene or nitronaphthalene. It is also possible to use as solvents for the alkylation acid anhydrides, acid amides or nitriles for example acetic anhydride, dimethylformamide or acetonitrile or dimethylsulphoxide. Instead of a solvent a large excess of alkylating agent may be used, but in this case it must be ensured that the mixture does not overheat since the reaction is strongly exothermic. Nevertheless it is in many cases necessary, especially in the presence of an organic solvent, to supply external heat to the reaction mixture in order to initiate the reaction. In special cases the alkylation may be carried out in an aqueous medium or with the use of an alcohol, if necessary in the presence of a small quantity of potassium iodide.

The dyestuff salts may be purified, if necessary, by dissolving them in water, and any unreacted starting dyestuff which forms an insoluble residue can be filtered off. The dyestuff can be isolated again from the aqueous solution by addition of a water-soluble salt, for example sodium chloride.

The quaternated dyestuffs obtained by the processes of the invention contain as anion preferably the residue of a strong acid, for example sulphuric acid or its semiesters, or an alkylsuphonic or arylsulphonic acid or a halogen ion. The afore-mentioned anions, which are introduced into the dyestuff molecule according to the present invention may be replaced by the anions of other inorganic acids, for example phosphoric or sulphuric acid, or organic acids, for example formic, acetic, chloracetic, oxalic, lactic or tartaric acid. In certain cases the free bases may also be used. The dyestuff salts may also be used in the form of double salts, for example with halides of the elements of the second group of the Periodic Table, especially zinc or cadmium chloride.

The new dyestuffs and dyestuff salts containing a quaternated amino group are suitable for dyeing or printing a wide variety of fully synthetic fibers, for example polyvinyl chloride, polyamide and polyurethane fibers, also fibers of polyesters of aromatic dicarboxylic acids, for example polyethylene terephthalate fibers, but especially polyacrylonitrile fibrous materials or polyvinylidenecyanide fibers (DARVAN). The term polyacrylonitrile fibers refers principally to polymers containing more than 80 percent, for example 80 to 95 percent of acrylonitrile; in addition, they may contain 5 to 20 percent of vinyl acetate, vinyl pyridine, vinyl chloride, vinylidene chloride, acrylic acid, acrylic esters, methacrylic acid, methacrylic esters and the like. These products are marketed, for example, under the following trade names: ACRILAN 1656, ACRILAN 41, CRESLAN, ORLON 44, CRYLOR HH, LEACRIL N, DYNEL, EXLAN, VONNEL, VEREL, ZEFRAN, WOLCRYLON, SSANTIW and also ORLON 42, DRALON, COURTELLE and others.

On these fibers or on mixtures thereof, the new dyestuffs produce intense and level dyeings having good fastness to light and good general fastness properties, especially good fastness to washing, perspiration, sublimation, creasing, decatizing, ironing, rubbing, carbonizing, tap water, sea water, dry cleaning, cross-dyeing and solvents. The new dyestuffs of this invention have, *inter alia*, also a good stability within a wide pH range, good affinity for example in aqueous solutions of different pH values and good fastness to kier-boiling. Moreover, the new dyestuffs as a rule reserve well on wool and other natural and synthetic polyamide fibers.

In general, the quaternated water-soluble dyestuffs show little sensitivity to electrolytes and some of them have a distinctly good solubility in water or organic solvents. Dyeing with the quaternated water-soluble dyestuffs is in general carried out in an aqueous neutral or acid medium, at the boil under atmospheric pressure, or at an elevated temperature in a closed vessel under superatmospheric pressure. The commercially available levelling agents have no deleterious effect but they are not necessary.

The dyestuffs defined above are especially suitable for three-color dyeing. Furthermore, by virtue of their stability towards hydrolysis, they can be used advantageously for high-temperature dyeing and for dyeing in the presence of wool. They may also be used for printing fibrous materials, using, for example, a printing paste containing the dyestuff and the bulk coloration of polymers of acrylonitrile and other synthetic materials, if necessary, in solution, the shades produced being fast to light and washing, and also for coloring oil paints or lacquers and for dyeing cotton, especially mordanted cotton, cellulose, regenerated cellulose and paper.

The new dyestuffs obtained by the processes of the invention that are not water-soluble and which contain a tertiary amino group, are advantageously used in a finely divided form in admixture with dispersants, for example soap, sulphite cellulose waste liquor or synthetic detergents or with a combination of different wetting and dispersing agents. As a rule it is advantageous to convert these dyestuffs into a dye preparation before dyeing; these dye preparations contain a dispersant and finely divided dyestuff in such a form that a fine dispersion is obtained when the dye preparation is diluted with water. Such dye preparations can be manufactured in known manner, for example by reprecipitating the dyestuff from sulphuric acid and grinding the resulting slurry with sulphite cellulose waste liquor, or alternatively by grinding the dyestuff in a highly efficient grinding device in the dry or wet state with or without adding a dispersant during grinding. they are also suitable for dyeing or printing a wide variety of fully synthetic fibers, for example polyacrylonitrile, polyvinyl chloride, polyamide or polyurethane fibers, but especially fibers of polyesters of aromatic dicarboxylic acids, for example polyethylene terephthalate fibers.

To obtain stronger shades, for example on polyethylene terephthalate fibers, it is advantageous to add a swelling agent to the dyebath or to carry out the dyeing operation under superatmospheric pressure at a temperature above 100° C, for example at 120° C. Suitable swelling agents are aromatic carboxylic acids, for example benzoic acid or salicylic acid, phenols, for example ortho- or para-hydroxydiphenyl, aromatic halogen compounds, for example chlorobenzene, ortho-dichlorobenzene or trichlorobenzene, phenylmethylcarbinol or diphenyl. When dyeing under superatmospheric pressure it is advantageous to adjust the dyebath to a weakly acid reaction, for example by adding a weak acid, for instance acetic acid.

The new dyestuffs containing a tertiary amino group lend themselves particularly well to dyeing by the so-called thermofixing process according to which the fabric to be dyed is impregnated with an aqueous dispersion of the dyestuff which advantageously contains 1 to 50 percent of urea and a thickener, especially sodium alginate, preferably at a temperature not exceeding 60° C and then squeezed in the usual manner, preferably so that the impregnated fabric retains 50 to 100 percent of its initial weight of dye-liquor.

To fix the dyestuff the impregnated fabric, advantageously after first having been dried, for example in a current of warm air, is heated to a temperature above 100° C, for example from 180° to 220° C.

The thermofixing process mentioned above is especially valuable for dyeing mixed fabrics made from polyester fibers and cellulose fibers, especially cotton. In this application the padding liquor contains, in addition to the dyestuff to be used according to this invention, dyestuffs suitable for dyeing cotton, for example direct dyestuffs or vat dyes, or especially the so-called reactive dyestuffs, that is to say dyestuffs which can be fixed on the cellulose fiber with formation of a chemical bond, for instance dyestuffs containing a chlorotriazine or chlorodiazine ring. In the latter case it is advantageous to add to the paddling liquor an acid acceptor, for example an alkali metal carbonate or phosphate, borate or perborate, or a mixture of these compounds. When vat dyes are used, the padded fabric has to be treated after the heat treatment with an aqueous alkaline solution of one of the reducing agents commonly used in vat dyeing.

The dyeings obtained on polyester fibers by the said process are advantageously subjected to an after-treatment, for example by heating with an aqueous solution of a non-ionic detergent.

The dyestuffs of this invention are also suitable for dyeing mixed fabrics made from polyester fibers and wool; the wool portion remains reserved and can subsequently be dyed with a wool dye.

According to the present process the new dyestuffs can be applied not only by impregnation but also by printing. For this purpose a printing paste is used, for example, which contains the finely dispersed dyestuff, if desired in admixture with one of the afore-mentioned cotton dyestuffs, and the usual printing assistants for example wetting and thickening agents, if desired or required in the presence of urea and/or of an acid acceptor.

The processes described provide strong dyeings and prints having excellent fastness properties, especially good fastness to light, sublimation, decatizing, washing, and washing in chlorinated water. A further advantage of the dyestuffs to be used in accordance with the invention is that they reserve well on wool and cotton.

Unless otherwise indicated, parts and percentages in the following Examples are by weight.

EXAMPLE 1

A mixture of 63.8 parts of the p-toluenesulphonic acid ester of N-ethyl-N,2-hydroxyethylaniline, 33.2 parts of N,N-dimethyl-4-methoxy-1-aminobenzene and 90 parts of chlorobenzene is heated to 135° C while being stirred and maintained at this temperature for 1 hour. After cooling the toluenesulphonate of the quaternary ammonium salt settles out in the form of colorless crystalline needles and is isolated in pure form by filtering and drying.

In an identical manner a quaternary ammonium salt is obtained by using 39.2 parts of 4-acetylamino-1-dimethylaminobenzene instead of N,N-dimethyl-4-methoxy-1-aminobenzene.

EXAMPLE 2

A mixture of 63.8 parts of the P-toluenesulphonic acid ester of N-ethyl-N,2-hydroxyethylaniline and 29.7 parts of 4-methyl-1-dimethylaminobenzene is heated to 140° C while being stirred. The resulting exothermic reaction gives rise to the quaternary ammonium salt of the formula

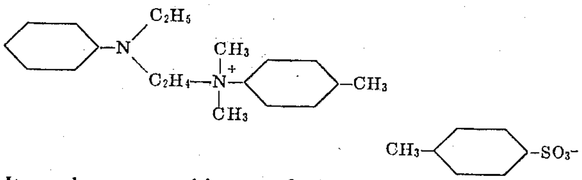

It can be prepared in pure form by crystallization from propanol.

EXAMPLE 3

4.54 Parts of the quaternary ammonium salt of Example 2 are dissolved in 100 parts of water and mixed with a solution of 4-nitrobenzene diazonium chloride prepared from 1.38 parts of 4-nitraniline, during which the coupling mixture is always kept neutral to Congo red by adding crystalline sodium acetate. On completion of the coupling the dyestuff is salted out with sodium chloride, filtered and dried. It dyes polyacrylonitrile fibers from a weakly acid bath brilliant scarlet shades.

Further dyestuffs of the general formula

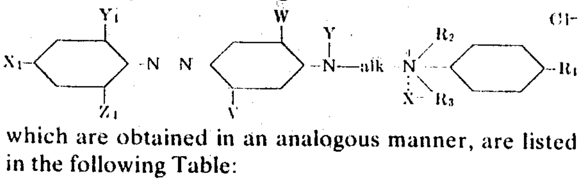

which are obtained in an analogous manner, are listed in the following Table:

| $X_1$ | $Y_1$ | $Z_1$ | V | W | Y | Alk | $R_1$ | $R_2$ | $R_3$ | $X^-$ | Shade |
|---|---|---|---|---|---|---|---|---|---|---|---|
| $-NO_2$ | $-H$ | $-H$ | $-H$ | $-H$ | $-C_2H_5$ | $(CH_2)_2$ | $-OCH_3$ | $-CH_3$ | $-CH_3$ | $Cl^-$ | Scarlet. |
| $-NO_2$ | $-H$ | $-H$ | $-H$ | $-H$ | $-C_2H_5$ | $(CH_2)_2$ | $-NHCOCH_3$ | $-CH_3$ | $-CH_3$ | $Cl^-$ | Do. |
| $-NO_2$ | $-H$ | $-Cl$ | $-H$ | $-H$ | $-C_2H_5$ | $(CH_2)_2$ | $-NHCOCH_3$ | $-CH_3$ | $-CH_3$ | $Cl^-$ | Red. |
| $-NO_2$ | $-H$ | $-Cl$ | $-H$ | $-H$ | $-C_2H_5$ | $(CH_2)_2$ | $-OCH_3$ | $-CH_3$ | $-CH_3$ | $Cl^-$ | Red. |
| $-NO_2$ | $-Cl$ | $-Cl$ | $-H$ | $-H$ | $-C_2H_5$ | $(CH_2)_2$ | $-OCH_3$ | $-CH_3$ | $-CH_3$ | $Cl^-$ | Yellowish brown. |
| $-NO_2$ | $-H$ | $-CN$ | $-H$ | $-H$ | $-C_2H_5$ | $(CH_2)_2$ | $-OCH_3$ | $-CH_3$ | $-CH_3$ | $Cl^-$ | Bluish red. |
| $-NO_2$ | $-H$ | $-H$ | $-H$ | $-H$ | $-C_2H_5$ | $(CH_2)_2$ | $-H$ | $-CH_3$ | $-CH_3$ | $Cl^-$ | Scarlet. |
| $-NO_2$ | $-H$ | $-H$ | $-H$ | $-H$ | $-C_2H_5$ | $(CH_2)_2$ | $-NH_2$ | $-CH_3$ | $-CH_3$ | $Cl^-$ | Do. |
| $-NO_2$ | $-H$ | $-CN$ | $-H$ | $-H$ | $-C_2H_5$ | $(CH_2)_2$ | $-N(CH_3)_2$ | $-CH_3$ | $-CH_3$ | $Cl^-$ | Bluish red. |
| $-NO_2$ | $-H$ | $-Cl$ | $-H$ | $-H$ | $-C_2H_4CN$ | $(CH_2)_2$ | $-OCH_3$ | $-CH_3$ | $-CH_3$ | $Cl^-$ | Scarlet. |
| $-NO_2$ | $-H$ | $-Cl$ | $-CH_3$ | $-H$ | $-C_2H_4OCH_3$ | $(CH_2)_2$ | $-H$ | $-CH_3$ | $-CH_3$ | $Cl^-$ | Red. |
| $-NO_2$ | $-H$ | $-CN$ | $-CH_3$ | $-OCH_3$ | $-CH_3$ | $(CH_2)_2$ | $-CH_3$ | $-CH_3$ | $-CH_3$ | $Br^-$ | Violet. |
| $-NO_2$ | $-Cl$ | $-Cl$ | $-CH_3$ | $-OCH_3$ | $-C_2H_5$ | $(CH_2)_2$ | $-OC_2H_5$ | $-CH_3$ | $-CH_3$ | $Cl^-$ | Brown. |
| $CH_3SO_2^-$ | $-H$ | $-Cl$ | $-CH_3$ | $-H$ | $-C_2H_5$ | $-(CH_2)_2-$ | $-OCH_3$ | $-CH_3$ | $-CH_3$ | $Cl^-$ | Orange. |
| $CH_3SO_2^-$ | $-H$ | $-Cl$ | $-Cl$ | $-H$ | $-C_2H_5$ | $-(CH_2)_2-$ | $-CH_3$ | $-CH_3$ | $-CH_3$ | $Cl^-$ | Do. |
| $-H$ | $-NO_2$ | $-H$ | $-H$ | $-H$ | $-CH_3$ | $-(CH_2)_2-$ | $-CH_3$ | $-(CH_2)_5-$ | | $Br^-$ | Do. |
| $-Cl$ | $-Cl$ | $-H$ | $-Cl$ | $-H$ | $-C_2H_5$ | $-(CH_2)_2-$ | $-N(CH_3)_2$ | $-CH_3$ | $-CH_3$ | $Cl^-$ | Yellow. |
| $-Br$ | $-Br$ | $-Br$ | $-Br$ | $-H$ | $-C_2H_4OCH_3$ | $-(CH_2)_2-$ | $-NHCO-$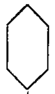 | $-CH_3$ | $-CH_3$ | $CH_3CO_4^-$ | Orange. |
| $-CN$ | $-H$ | $-Cl$ | $-CH_3$ | $-H$ | $-CH_2CH_2COOCH_3$ | $-(CH_2)_2-$ | $-OC_2H_5$ | $-(CH_2)_2O(CH_2)_2-$ | | $CH_3-$$-SO_3^-$ | Do. |
| $-COOC_2H_5$ | $-CF_3$ | $-H$ | $-C_2H_5$ | $-H$ | $-C_2H_5$ | $-(CH_2)_2-$ | $-OC_4H_9$ | $-CH_3$ | $-CH_3$ | $NO_3^-$ | Do. |
| $-SO_2CH_3$ | $-Cl$ | $-H$ | $-OCH_3$ | $-OCH_3$ | $-CH_3$ | $-(CH_2)_2-$ | $-C_2H_5$ | $-CH_3$ | $-CH_3$ | $Cl^-$ | Do. |
| $-SO_2NH_2$ | $-CH_3$ | $-Cl$ | $-NHCOCH_3$ | $-H$ | $-CH_3$ | $-(CH_2)_3-$ | $-OCH_3-$ | $-(CH_2)_4-$ | | $Cl^-$ | Red. |
| $-NO_2$ | $-CN$ | $-Cl$ | $-CH_3$ | $-H$ | $-C_2H_4O$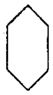 | $-(CH_2)_2-$ | $-NHCOCH_3$ | $-CH_3$ | $-CH_3$ | $Br^-$ | Violet. |
| $-NO_2$ | $-OCH_3$ | $-NO_2$ | $-H$ | $-CH_3$ | $-C_2H_5$ | $-(CH_2)_2-$ | $-CH_3$ | $-C_2H_4OH$ | $-C_2H_5$ | $Br^-$ | Do. |
| $-NO_2$ | $-COOCH_3$ | $-H$ | $-H$ | $-H$ | $-C_2H_4OC_2H_5$ | $-(CH_2)_2-$ | $-H$ | $-(CH_2)_5-$ | | $ClO_4-$ | Bluish red. |
| $-NO_2$ | $-Br$ | $-CN$ | $-NHCOC_3H_7$ | $-CH_3$ | $-C_2H_5$ | $-(CH_2)_2-$ | $-C_2H_5$ | $-CH_3$ | $-CH_3$ | $HSO_4-$ | Blue. |

| $X_1$ | $Y_1$ | $Z_1$ | V | W | Y | Alk | $R_1$ | $R_2$ | $R_3$ | $X^-$ | Shade |
|---|---|---|---|---|---|---|---|---|---|---|---|
| $-NO_2$ | $-Cl$ | $-SO_2CH_3$ | $-H$ | $-H$ | $-C_2H_4S-$  | $-(CH_2)_2-$ | $-CH_3$ | $-CH_2-$ 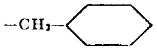 | $-CH_3$ | $Cl^-$ | Violet. |
| $-NO_2$ | $-NO_2$ | $-\underset{O}{C}-$  | $-CH_3$ | $-OCH_3$ | $-CH_3$ | $-CH_2-\overset{CH_3}{CH}-$ | $-OCH_3$ | $-CH_3$ | $-CH_3$ | $Br^-$ | Reddish blue. |
| $-NO_2$ | $Cl$ | $-COOC_3H_7$ | $H$ | $H$ | $-CH_3$ | $-(CH_2)_2-$ | $-CH_3$ | $-C_6H_{11}$ | $-CH_3$ |  $-COO^-$ | Violet. |
| $-H$ | $-H$ | $-Cl$ | $-H$ | $-H$ | $-C_2H_5$ | $-(CH_2)_2-$ | $-OC_2H_5$ | $-CH_3$ | $-CH_3$ | $Cl^-$ | Yellow. |
| $-Cl$ | $-H$ | $-H$ | $-H$ | $-CH_3$ | $-C_2H_5$ | $-(CH_2)_2-$ | $-N(C_2H_5)_2$ | $-C_2H_5$ | $-C_2H_5$ | $NO_3^-$ | Do. |
| $-Br$ | $-H$ | $-H$ | $-H$ | $-H$ | $-C_2H_5$ | $-(CH_2)_2-$ | $-NH_2$ | $-CH_3$ | $-CH_3$ | $Cl^-$ | Do. |
| $-NO_2$ | $-H$ | $-H$ | $-CH_3$ | $-H$ | $-CH_3$ | $-(CH_2)_3-$ | $-OCH_3$ | $-(CH_2)_4-$ | | $Cl^-$ | Orange. |
| $-CN$ | $-H$ | $-H$ | $-CH_3$ | $-OCH_3$ | $-CH_3$ | $-(CH_2)_2-$ | $-CH_3$ | $-CH_3$ | $CH_3$ | $Cl^-$ | Do. |
| $-COOC_4H_9$ | $-H$ | $-H$ | $H$ | $-H$ | $-C_2H_4OCH_3$ | $-(CH_2)_2-$ | $-CH(CH_3)_2$ | $-CH_3$ | $-C_2H_5$ | $Br^-$ | Yellow. |
| $-Br$ | $-H$ | $-Br$ | $CH_3$ | $C_2H_5$ | $-C_2H_4OCOCH_3$ | $-(CH_2)_2$ | $OC_2H_5$ | $-C_2H_4OH$ | $-C_2H_4OH$ | $NO_3^-$ | Do. |
| $-Cl$ | $-CH_3$ | $H$ | $CH_3$ | $-H$ | $C_2H_5$ | $-(CH_2)_2$ | $-NH_2$ | $-CH_2-$  | $-CH_3$ | $Cl^-$ | Do. |
| $-CF_3$ | $-NO_2$ | $-H$ | $H$ | $-H$ | $C_2H_5$ | $-(CH_2)_2$ | $-NHCOCH_3$ | $-CH_3$ | $-CH_3$ | 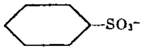 $-SO_3^-$ | Orange. |
| $-NO_2$ | $-CF_3$ | $-H$ | $H$ | $H$ | $C_2H_4CN$ | $-(CH_2)_2$ | $-CH_3$ | $-(CH_2)_2O(CH_2)_2-$ | | $ClO_4^-$ | Do. |
| $-Cl$ | $-H$ | $CN$ | $OCH_3$ | $OCH_3$ | $CH_2CO-$ 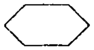 | $-(CH_2)_2$ | $CH_3$ | $-(CH_2)_4-$ | | $Br^-$ | Do. |
| $-NO_2$ | $-CN$ | $H$ | $NHCO-$ 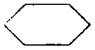 | $-OC_3H_7$ | $-C_2H_5$ | $(CH_2)_2$ | $-N(C_2H_5)_2$ | $-C_2H_5$ | $-C_2H_5$ | $HSO_4^-$ | Violet. |
| $-H$ | $-H$ | $-COOCH_3$ | $-CH_3$ | $-H$ | $-C_2H_5$ | $-(CH_2)_3-$ | $-C_4H_9$ | $-CH_3$ | $-CH_3$ |  $-COO^-$ | Yellow. |
| $-Cl$ | $-COOC_2H_5$ | $-H$ | $-H$ | $H$ | $-CH_3$ | $-(CH_2)_2-$ | $-OCH_3$ | $-CH_3$ | $-CH_3$ | $H_2PO_4^-$ | Do. |
| $-NO_2$ | $-COOC_2H_5$ | $-H$ | $-C_2H_5$ | $-OC_2H_5$ | $-CH_3$ | $-(CH_2)_2-$ | $-CH_3$ | $-(CH_2)_5-$ | | $ClO_4^-$ | Bluish red |
| $-SO_2N(C_2H_5)_2$ | $-H$ | $-H$ | $-OCH_3$ | $-H$ | $-C_2H_4CONH_2$ | $-(CH_2)_2$ | | $-CH_3$ | $-CH_3$ | $Cl^-$ | Orange. |
| $-NO_2$ | $-Cl$ | $-H$ | $-NHCOOC_2H_5$ | $-OCH_3$ | $-CH_3$ | $-(CH_2)_2$ | $-NHCOCH_3$ | $-C_2H_4OH$ | $-C_2H_5$ | $Br^-$ | Violet. |
| $-Cl$ | $-NO_2$ | $-H$ | $-H$ | $-C_2H_5$ | $-C_2H_4CON(CH_3)_2$ | $-(CH_2)_3$ | $-C_2H_5$ | $-CH_3$ | $-CH_3$ | $CH_3SO_3^-$ | Red. |
| $-COOC_2H_5$ | $-Cl$ | $-H$ | $-CH_3$ | $-CH_3$ | $-C_2H_4COOH$ | $-(CH_2)_2$ | $-OC_3H_7$ | $-C_6H_{11}$ | $-CH_3$ | $Br^-$ | Orange. |
| $-H$ | $-H$ | $-SO_2CH_3$ | $-Cl$ | $-H$ | $-CH_3$ | $-(CH_2)_2$ | $-C_2H_5$ | $-CH_3$ | $-CH_3$ | $Cl^-$ | Yellow. |
| $-SO_2CH_3$ | $-H$ | $-H$ | $-OCH_3$ | $-OCH_3$ | $-C_2H_5$ | $-(CH_2)_2$ | $-C_2H_5$ | $-CH_2-\overset{CH_3}{CH}-(CH_2)_3-$ | | $\frac{1}{2}(COO^-)_2$ | Orange. |
| $-NO_2$ | $-SO_2CH_3$ | $-H$ | $-NHCOCH_3$ | $-OC_4H_9$ | $-C_2H_4CN$ | $-(CH_2)_2$ | $-CH_3$ | $-CH_2\overset{CH_3}{CH}O(CH_2)_2-$ | | $Br^-$ | Violet. |
| $-NO_2$ | $-NO_2$ | $-SO_2CH_3$ | $-CH_3$ | $-OCH_3$ | $-C_2H_5$ | $-(CH_2)_2$ | $-CH_3$ | $-(CH_2)_5-$ | | $Cl^-$ | Do. |
| $-NO_2$ | $-NO_2$ | $-H$ | $-H$ | $-H$ | $-C_2H_4O-$  | $(CH_2)_3$ | $OCH(CH_3)_2$ | $-CH_3$ | $-CH_3$ | $NO_3^-$ | Do. |
| $-CN$ | $-CN$ | $-H$ | $-C_2H_5$ | $-C_2H_5$ | $-C_2H_4CN$ | $-(CH_2)_2$ | $-NHCOCH_3$ | $-C_2H_4OH$ | $-CH_3$ | $\frac{1}{2}(SO_4^{-2})$ | Red. |
| $-CN$ | $-Cl$ | $-Cl$ | $-OCH_3$ | $H$ | $-C_2H_5$ | $-(CH_2)_2-$ | $-C_2H_5$ | $-CH_3$ | $-CH_3$ | $Br^-$ | Orange. |
| $-NO_2$ | $-Cl$ | $-Cl$ | $-CH_3$ | $-OCH_3$ | $-C_2H_4COOC_2H_5$ | $-(CH_2)_2-$ | $-OC_2H_5$ | $-(CH_2)_4-$ | | $ClO_4^-$ | Brown. |
| $-CN$ | $-Cl$ | $-CN$ | $-NHCO-$ 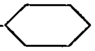 | $-H$ | $-CH_3$ | $-(CH_2)_2-$ | $-C_2H_5$ | $-CH_3$ | $-CH_3$ | $CH_3CH_2COO^-$ | Violet. |
| $-NO_2$ | $-NO_2$ | $-Cl$ | $-CH_3$ | $-OC_2H_5$ | $-CH_3$ | $-(CH_2)_2-$ | $-COOC_2H_5$ | $-CF_3$ | $-CH_3$ | $Cl^-$ | Do. |
| $-NO_2$ | $-NO_2$ | $-Br$ | $-NHCOC(CH_3)_3$ | $-OCH_3$ | $-C_2H_4OCH_3$ | $-(CH_2)_2-$ | $-CF_3$ | $-CF_3$ | $-C_2H_4OH$ | $Cl^-$ | Blue. |

| $X_1$ | $Y_1$ | $Z_1$ | V | W | Y | Alk | $R_1$ | $R_2$ | $R_3$ | $X^-$ | Shade |
|---|---|---|---|---|---|---|---|---|---|---|---|
| $-NO_2$ | $-NO_2$ | $-CN$ | $-H$ | $-CH_3$ | $-CH_3$ | $-CH_2-CH(CH_3)-$ | $-CH_3$ |  | $-C_2H_4OH$ | $Br^-$ | Do. |
| $-SO_2NHC_2H_5$ | $-H$ | $-H$ | $-H$ | $-H$ | $-C_2H_4S-$ 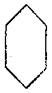 | $-(CH_2)_2-$ | $-H$ | $-CH_2-CH(CH_3)-(CH_2)_2-$ | | $NO_3^-$ | Orange. |
| $-SO_2N(C_2H_5)$ | $-Cl$ | $-H$ | $-H$ | $-H$ | $-CH_3$ | $-(CH_2)_2-$ | $-CH(CH_3)_2$ | $-CH_3$ | $-CH_3$ | $Cl^-$ | Do. |
| 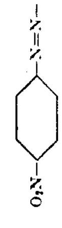 | $-H$ | $-CH_3$ | $-CH_3$ | $-H$ | $-CH_3$ | $-(CH_2)_2-$ | $-OCH_3$ | $-CH_3$ | $-CH_3$ | $Br^-$ | Red. |
| 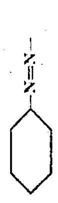 | $-H$ | $-H$ | $-H$ | $-H$ | $-C_2H_5$ | $-(CH_2)_2$ | $-NHCOCH_3$ | $-CH_3$ | $-CH_3$ | $NO_3^-$ | Orange. |
| 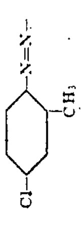 | $-H$ | $-H$ | $-H$ | $-H$ | $-C_2H_4OCH_3$ | $-(CH_2)_2-$ | $-CH_3$ | $-CH_3$ | $-CH_3$ | $Cl^-$ | Do. |
| 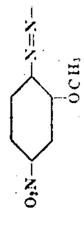 | $-H$ | $H$ | $-CH_3$ | $-H$ | $-CH_3$ | $-(CH_2)_2$ | $OC_2H_5$ | $CH_3$ | $CH_3$ | $Cl^-$ | Red. |

EXAMPLE 4

A solution of 195 parts of N,2'-methoxyethyl-N,2''-hydroxyethyl-3-methyl-1-aminobenzene in 250 parts of pyridine is mixed dropwise at −5° to 0° C with 130 parts of methane-sulphonyl chloride. The batch is stirred for 4 hours at 0° C and then poured into 2,000 parts of ice water. The emulsion formed on addition of 200 parts of concentrated hydrochloric acid is extracted with ether, the ethereal solution is dried over anhydrous sodium sulphate and evaporated at a low temperature under vacuum to yield 253 parts of a faintly yellowish oil which is uniform according to its thin-layer chromatogram. In an analogous manner the methanesulphonic acid esters of N,2-cyanoethyl-N,2'-hydroxyethylaniline and of N-methyl-N,2'-hydroxyethyl-2-amino-4-methylanisole are obtained.

A mixture of 54.6 parts of N,2'-methoxy-N,2''-hydroxy-ethyl-3-methyl-1-aminobenzenemethane sulphonic acid ester, 28 parts of N,N-dimethyl-1-amino-4-methylbenzene and 100 parts of chlorobenzene is stirred for 4 hours at 100° to 120° C and the reaction mixture is then distilled with steam. The remaining aqueous solution contains the coupling component of the formula

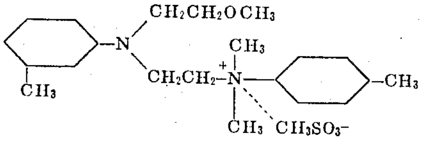

17.7 Parts of 5-amino-3-phenyl-1,2,4-thiadiazole are diazotized in a mixture of 100 parts of N-nitrosylsulphuric acid and 100 parts of glacial acetic acid and the diazo compound is dropped into a well-stirred, well-cooled aqueous solution of 41 parts of the coupling component obtained above. On completion of the addition the batch is rendered neutral to Congo red with crystalline sodium acetate, then made up to a volume of 2,000 parts with water, and the dyestuff is salted out with 100 parts of sodium chloride; it dyes polyacrylonitrile fibers brilliant red shades of excellent fastness to light.

Further dyestuffs of the general formula

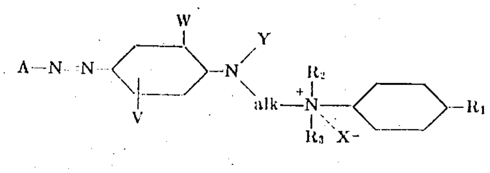

obtainable as described in this Example, are listed in the following Table:

| A | V | W | Y | Alk | $R_1$ | $R_2$ | $R_3$ | $X^-$ | Shade |
|---|---|---|---|---|---|---|---|---|---|
| 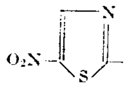 | $-H$ | $-H$ | $-C_2H_5$ | $-C_2H_4$ | $-CH_3$ | $-CH_3$ | $-CH_3$ | $Br^-$ | Reddish blue. |
| 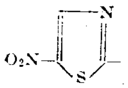 | $-H$ | $-H$ | $-C_2H_4CN$ | $C_2H_4$ | $-CH_3$ | $-CH_3$ | $-CH_3$ | $Br^-$ | Violet. |
| 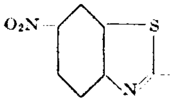 | $-H$ | $-H$ | $-C_2H_4OCH_3$ | $C_2H_4$ | $-NHCOCH_3$ | $-CH_3$ | $-CH_3$ | $Cl^-$ | Do. |
| 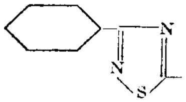 | $-H$ | $-H$ | $-C_2H_5$ | $-C_2H_4$ | $-CH_3$ | $-CH_3$ | $-CH_3$ | $Br^-$ | Red. |
| 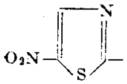 | $-CH_3$ | H | $-C_2H_4OC_2H_5$ | $-CH_2-CH_2-$ | $-H$ | $-C_2H_5$ | $-CH_3$ | $Cl^-$ | Blue. |
| 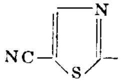 | $-Cl$ | H | $CH_2COOC_2H_5$ | $CH_3$<br>$-CH_2-CH-$ | $-CH_3$ | $-C_2H_4OH$ | $-C_2H_5$ | $Br^-$ | Bluish red. |
| 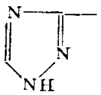 | $-Br$ | H | $-C_2H_4O-$  | $-CH_2-CH_2-$ | $-NH_2$ | $-CH_2-$ 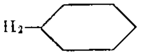 | $-CH_3$ | $NO_3^-$ | Yellow. |
| 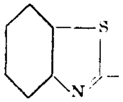 | $-OCH_3$ | $-OCH_3$ | $-CH_2COCH_3$ | $-CH_2-CH_2-$ | $-N(CH_3)_2$ | $-C_5H_{11}$ | $-CH_3$ | $CH_3SO_4^-$ | Red. |
| 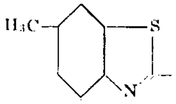 | $-C_2H_5$ | $-CH_3$ | $-C_2H_4S-$  | $-CH_2-CH_2-$ | $-NHCOC_4H_9$ | $-C_2H_4OH$ | $-C_2H_4OH$ | $Cl^-$ | Red. |
| 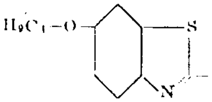 | $-NHCOC_2H_5$ | $-H$ | $-C_2H_4OC(=O)-CH_3$ | $-CH_2-CH_2-$ | $-OCOCH_3$ | $-CH_2-CH_2-O-CH_2-CH_2-$ | | $Cl^-$ | Red. |
| 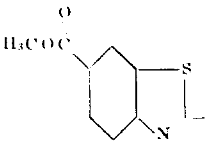 | $-H$ | $-CH_3$ | $-C_2H_4CN$ | $-(CH_2)_3$ | $-OC_2H_5$ | $CH_3$<br>$-CH_2-CH-(CH_2)_3-$ | | $Br^-$ | Red. |

| A | V | W | Y | Alk | $R_1$ | $R_2$ | $R_3$ | $X^-$ | Shade |
|---|---|---|---|---|---|---|---|---|---|
| 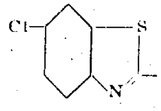 | $-CH_3$ | H | $-C_2H_4CONH_2$ | $-CH_2-CH_2-$ | $-C_2H_5$ | | $-(CH_2)_5-$ | 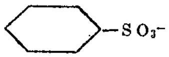 | Red. |
| 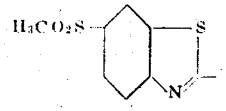 | $-H$ | $-OC_2H_5$ | $-C_3H_7$ | $-CH_2-\overset{CH_3}{\overset{\vert}{C}H}-$ | $-OC_2H_5$ | | $-(CH_2)_4-$ | $CH_3SO_3^-$ | Red. |
| 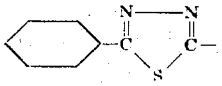 | $-H$ | $-H$ | $-C_2H_4\overset{O}{\overset{\Vert}{C}}-N(CH_3)_2$ | $-CH_2-CH_2-$ | $-C_3H_7$ | $-CH_3$ | $-CH_3$ | $HSO_4^-$ | Red. |
| 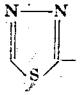 | $-CH_3$ | H | 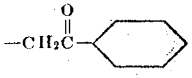 | $-CH_2-CH_2$ | $-H$ | $-CH_3$ | $-CH_3$ | $H_2PO_4^-$ | Orange. |
| 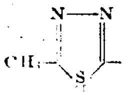 | $-CH_3$ | $-OCH_3$ | $-C_2H_5$ | $-CH_2-CH_2-$ | $-C_2H_5$ | $-CH_3$ | $-C_2H_5$ | $(SO_4^{-2})_{\frac{1}{2}}$ | Do. |
| 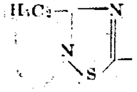 | 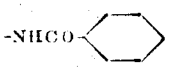 | $-OCH_3$ | $-CH_3$ | $-CH_2-CH_2-$ | $-NHCOCH_3$ | $-CH_3$ | $-CH_3$ | $ClO_4^-$ | Red. |
| 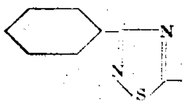 | $-CH_3$ | $-H$ | $-C_2H_5$ | $-CH_2-CH_2-$ | $-OCH_3$ | | $-(CH_2)_4-$ | $Cl^-$ | Red. |
| 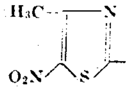 | $-H$ | $-H$ | $-C_2H_4CN$ | $-(CH_2)_3$ | 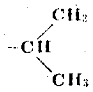 | $-CH_3$ | $-CH_3$ |  | Violet. |
| 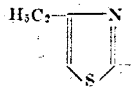 | $-CH_3$ | $-OCH_3$ | $-CH_3$ | $-CH_2-CH_2-$ | $-OC_4H_9$ | $-CH_3$ | $-C_2H_4OH$ | $Br^-$ | Orange. |
| 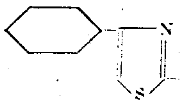 | $-OCH_3$ | $-OCH_3$ | $-C_2H_4OCH_3$ | $-CH_2-CH_2-$ | $-NH_2$ | $-CH_3$ | $-CH_3$ | $CH_3SO_4^-$ | Red. |
| 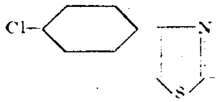 | $-H$ | $-H$ | $-CH_3$ | $-CH_2-CH_2-$ | $-OC_2H_5$ | | $-(CH_2)-S-(CH_2)_2-$ | $NO_3^-$ | Red. |

| A | V | W | Y | Alk | $R_1$ | $R_2$ | $R_3$ | $X^-$ | Shade |
|---|---|---|---|---|---|---|---|---|---|
| 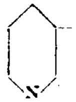 | $-NHCOC_4H_9$ | $-H$ | $-C_2H_5$ | $-CH_2-CH_2-$ | $-N(CH_3)_2$ | $-CH_3$ | $-CH_3$ | $Br^-$ | Yellow. |
| 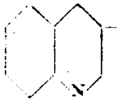 | $-Br$ | $-H$ | $-CH_2COOCH_3$ | $-CH_2-CH_2-$ | $-OCO-$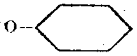 | $-CH_3$ | $-C_2H_4OH$ | 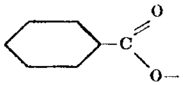 | Do. |
|  | $-CH_3$ | $-OCH_3$ | 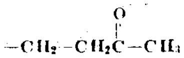 | $-CH_2-CH_2-$ | 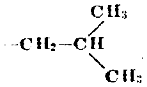 | $-CH_2-$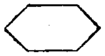 | $-CH_3$ | $C_3H_7CO_2^-$ | Do. |
|  | $-H$ | $-H$ | $-C_2H_5$ | $-(CH_2)_3-$ | $-H$ | $-CH_3$ | $-CH_3$ | $Br^-$ | Do. |
| 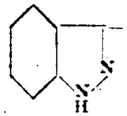 | $CH_3$ | $-H$ | 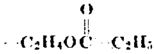 | $-CH_2-CH_2-$ | $-OCH_3$ | $-C_2H_4OH$ | $-C_2H_4OH$ | $Cl^-$ | Yellowish brown. |
| 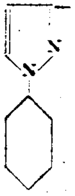 | $-Cl$ | $-H$ | $-C_2H_5$ | $-CH_2-CH_2-$ | $-NHCOC_2H_5$ | $-CH_3$ | $-CH_3$ | $NO_3^-$ | Yellow. |
| 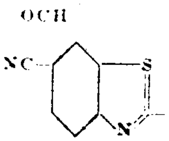 | $-CH_3$ | $-H$ | $CH_3$ | 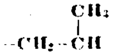 | $-N(C_2H_5)_2$ | $-C_2H_5$ | $-C_2H_5$ | $Br^-$ | Bluish red. |
|  | $-H$ | $-H$ | $-C_2H_4O-$ | $-CH_2-CH_2-$ | $-C_2H_5$ | 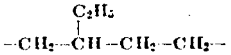 | | $ClO_4^-$ | Orange. |

EXAMPLE 5

A mixture of 196 parts of N,2-chloroethyl-tetrahydroquinoline, 300 parts of 4-dimethylaminoanisole and 7.5 parts of sodium iodide is stirred for 40 hours at 120° to 130° C. At this stage N,2-chloroethyl-tetrahydroquinoline can practically no longer be identified in the reaction mixture. While the reaction mixture is still warm, it is mixed with 1,000 parts of water and the excess of starting material is distilled with steam. The aqueous solution is filtered while hot with addition of 30 parts of active carbon, and its content of the coupling component of the formula

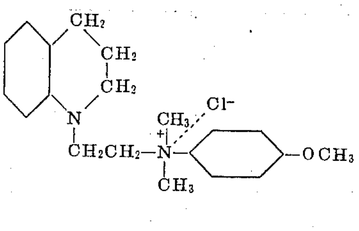

is determined by titration with 4-nitrobenzene-diazonium chloride solution.

An aliquot part of the solution, containing 34.7 parts of the coupling component, is mixed, while cooling with ice, with a diazo solution prepared from 17.25 parts of 2-chloro-4-nitro-1-aminobenzene and the coupling is completed by adding sodium acetate until a neutral reaction to Congo red appears. The precipitation of the dyestuff is completed by adding sodium chloride, and the dyestuff is suction filtered and dried; it dyes polyacrylonitrile fibers fast ruby red shades.

The following Table lists in Column III the shades produced by the dyestuffs obtained by using the diazo compounds of the amines shown in Column II for coupling with the same coupling component instead of 2-chloro-4-nitro-1-aminobenzene.

| I<br>No. | II<br>Diazo Component | III<br>Shade on poly-acrylonitrile |
|---|---|---|
| 1 | 4-nitroaniline | red |
| 2 | 2,6-dichloro-4-nitroaniline | brown |
| 3 | 2-amino-5-nitrobenzonitrile | violet |
| 4 | 5-nitro-2-aminothiazole | blue |
| 5 | 5-amino-3-phenyl-1,2,4-thiadiazole | bluish red |
| 6 | 4-amino-3-chlorophenylmethylsulphone | orange |
| 7 | 2-amino-6-nitrobenzthiazole | reddish blue |

Further dyestuffs which are obtained by the procedure given in Example 5 are listed in the following table:

| Diazo component | Coupling Component | Shade |
|---|---|---|
| 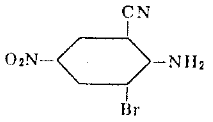 | 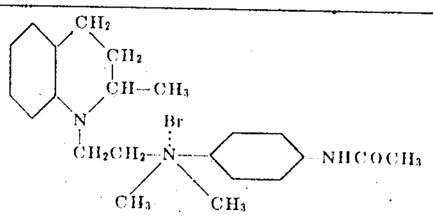 | Blue. |
| 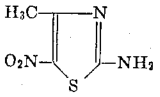 | Same as above | Do. |
| 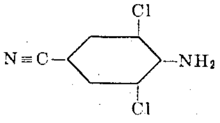 | 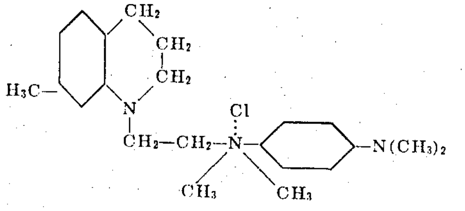 | Red. |
| 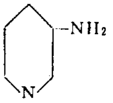 | Same as above | Red. |
| 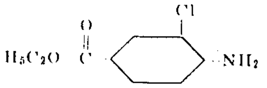 | 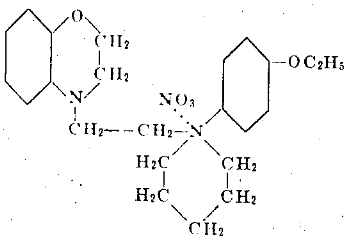 | Red. |

| Diazo component | Coupling component | Shade |
|---|---|---|
| 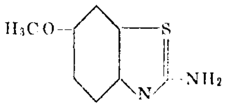 | Same as above | Red. |
| 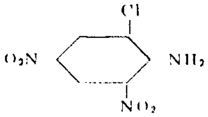 | 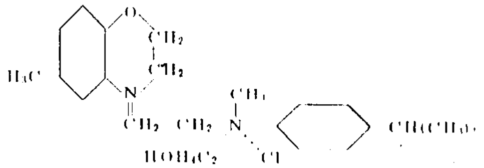 | Reddish blue. |
| 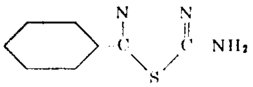 | Same as above | Bluish red. |

EXAMPLE 6

35 Parts of the monoazo dye of the formula

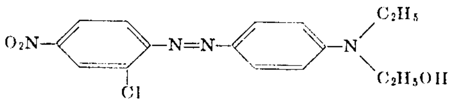

[obtained by coupling diazotized 2-chloro-4-nitro-1-aminobenzene with N-ethyl-N,2'-hydroxyethyl-1-aminobenzene] are dissolved in 150 parts of pyridine and within 30 minutes at 10° to 15° C 20 parts of benzenesulphonyl chloride are added. The reaction mixture is stirred for 4 hours at 10° to 15° C, then diluted with 1,000 parts of ice water, and the precipitated dyestuff is suction filtered, washed free from pyridine with much cold water and dried at 30° C under vacuum.

10 Parts of the resulting dyestuff of the formula

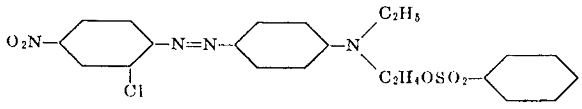

and 4 parts of 4-dimethylaminotoluene are homogeneously mixed and melted on a steam bath for 3 hours with occasional stirring. The melt is diluted at 70° C with 50 parts of ethyl acetate, whereby any unreacted starting material is dissolved, and the quaternary dyestuff salt settles out as a dense crystal magma. It is suction filtered and the dyestuff washed with ethylacetate; on polyacrylonitrile fibers it produces red shades of good fastness to light.

In an analogous manner very similar red dyestuffs are obtained when 4-dimethylaminotoluene is replaced by 4-dimethylaminoanisole or 4-dimethylaminoacetanilide or N-p-methoxyphenyl-piperidine or N-(4'-methyl)-phenylmorpholine.

Dyeing Instructions

1 Part of dyestuff is dissolved in 2.000 parts of water containing 4 parts of 80 percent acetic acid, 1 part of sodium acetate cryst. and 10 parts of anhydrous sodium sulfate. 100 Parts of dried yarn from polyarcrylonitrile staple fibers are immersed in this dyebath at 60° C, the temperature is raised to 100° C within half an hour, and the yarn is dyed for one hour at the boil, then rinsed and dried.

I claim:

1. Basic azo dye which is free from acid groups imparting solubility in water, and which correspond to the formula

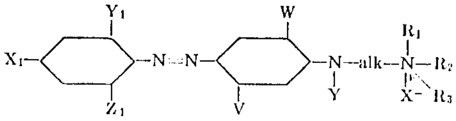

in which $X_1$ is a member selected from the group consisting of hydrogen, chlorine, bromine, cyano, lower carbalkoxy, trifluoromethyl, lower alkyl-sulfonyl, sulfonamido, N-lower alkyl sulfonamido, nitro, phenylazo, nitrophenylazo, chlorophenylazo, lower alkylphenylazo and lower alkoxyphenylazo, $Y_1$ is a member selected from the group consisting of hydrogen, chlorine, bromine, nitro, lower alkyl, lower alkoxy, trifluoromethyl, lower carbalkoxy and cyano and $Z_1$ is a member selected from the group consisting of hydrogen, chlorine, bromine, nitro, lower carbalkoxy, cyano, lower alkylsulfonyl and benzoyl, V is hydrogen, chlorine, bromine, lower alkyl, lower alkoxy, benzoylamino, alkylcarbonylamino containing at most eight carbon atoms, or alkoxy-carbonylamino containing at most 8 carbon atoms, W is hydrogen, lower alkyl or lower alkoxy, Y is lower alkyl or substituted lower alkyl wherein the substituents are selected from the group consisting of lower alkoxy, lower alkoxycarbonyl, phenoxy, phenthio, lower alkanoyl, lower alkanoyloxy, benzoyl, cyano, carbonamide and N-lower alkyl carbonamido, alk stands for ethylene, propylene or isopropylene, $R_2$ is selected from the group consisting of lower alkyl, hydroxy lower alkyl, benzyl and cyclohexyl; $R_3$ is lower alkyl- or hydroxy lower alkyl, and $R_1$ is unsubstituted phenyl or phenyl substituted by a member selected from the group consisting of lower alkyl, lower alkoxy, amino, di-lower alkylamino, benzoylamino, or alkylcarbonylamino of up to eight carbon atoms and wherein $R_2$ and $R_3$ together with the nitrogen form an unsubstituted or lower alkyl-substituted piperidine, morpholine, thiomorpholine or pyrrolidine ring, and the group —NY— may form together with the benzene coupling component an unsubstituted or lower alkyl-substituted tetrahydroquinoline or benzmorpholine and X stands for an anion of a strong inorganic acid, of a sulfonic acid semi-ester or of a carboxylic acid.

2. Azo dyes as claimed in claim 1, in which Y in the given formula represents a member selected from the group consisting of ethyl, β-lower alkoxy ethyl, β-cyanoethyl and acetoxyethyl, V is hydrogen, lower alkyl or carboxylic acylamino of up to four carbon atoms and W is hydrogen or lower alkoxy.

3. The basic azo dyestuff as claimed in claim 1 and corresponding to the formula

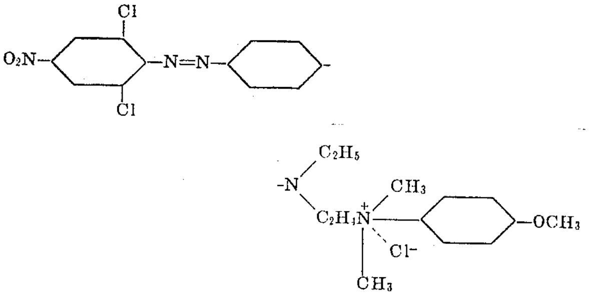

4. The basic azo dyestuff as claimed in claim 1 and corresponding to the formula

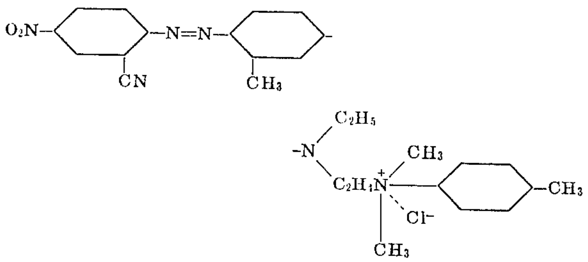

5. The basic azo dyestuff as claimed in claim 1 and corresponding to the formula

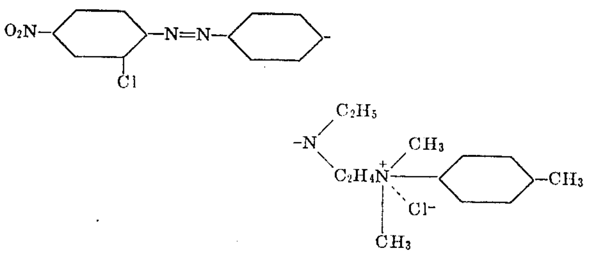

* * * * *